United States Patent
Contreras et al.

(10) Patent No.: US 9,196,266 B1
(45) Date of Patent: Nov. 24, 2015

(54) INTEGRATED LEAD SUSPENSION (ILS) FOR TWO-DIMENSIONAL MAGNETIC RECORDING (TDMR) DISK DRIVE

(71) Applicant: HGST Netherlands B.V., Amsterdam (NL)

(72) Inventors: John Contreras, Palo Alto, CA (US); Albert John Wallash, Morgan Hill, CA (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/340,690

(22) Filed: Jul. 25, 2014

(51) Int. Cl.
*G11B 5/48* (2006.01)
*G11B 5/09* (2006.01)

(52) U.S. Cl.
CPC .............. *G11B 5/09* (2013.01); *G11B 5/4853* (2013.01)

(58) Field of Classification Search
None
See application file for complete search history.

(56) References Cited

U.S. PATENT DOCUMENTS

| | | | |
|---|---|---|---|
| 6,275,358 B1 * | 8/2001 | Balakrishnan et al. | 360/264.2 |
| 7,352,535 B2 * | 4/2008 | Arya et al. | 360/245.9 |
| 7,629,539 B2 * | 12/2009 | Ishii et al. | 174/254 |
| 7,710,688 B1 * | 5/2010 | Hentges et al. | 360/245.9 |
| 8,154,827 B2 | 4/2012 | Contreras et al. | |
| 9,036,305 B1 * | 5/2015 | Contreras et al. | 360/264.2 |
| 9,036,306 B1 * | 5/2015 | Nishiyama et al. | 360/264.2 |
| 2006/0158785 A1 * | 7/2006 | Arya et al. | 360/246 |
| 2010/0007993 A1 * | 1/2010 | Contreras et al. | 360/245.8 |
| 2011/0141626 A1 * | 6/2011 | Contreras et al. | 360/245.4 |
| 2011/0149441 A1 * | 6/2011 | Alex et al. | 360/245.8 |
| 2012/0033319 A1 * | 2/2012 | Contreras et al. | 360/39 |
| 2013/0286502 A1 | 10/2013 | Erden et al. | |
| 2015/0077879 A1 * | 3/2015 | Contreras et al. | 360/67 |

\* cited by examiner

*Primary Examiner* — Tan X Dinh
(74) *Attorney, Agent, or Firm* — Thomas R. Berthold (57) ABSTRACT

An interconnect between the read/write circuitry and the read/write head in a magnetic recording hard disk drive (HDD) for two-dimensional magnetic recording (TDMR) has the read sensor signal lines located on a lower level of a bi-level structure of conductive lines. Common return lines are located on an upper level above the signal lines and on the lower level between the signal lines. All of the return lines on the upper level are connected to one another by cross-connect lines, and vias are located along the interconnect and connect the upper return lines with the lower return lines and with the ground plane of the interconnect's electrically conductive substrate. The interconnect is a coaxial-like interconnect because the return lines are located around each signal line and thus shield each signal line from the other signal lines, much like the outer conductive shield of a coaxial cable.

11 Claims, 8 Drawing Sheets

INTEGRATED LEAD SUSPENSION (ILS) FOR TWO-DIMENSIONAL MAGNETIC RECORDING (TDMR) DISK DRIVE

BACKGROUND OF THE INVENTION

1. Field of the Invention

The invention relates generally to the interconnect between the read/write circuitry and the read/write head in a magnetic recording hard disk drive (HDD), and more particularly to an interconnect for the read sensors in a two-dimensional magnetic recording (TDMR) HDD.

2. Description of the Related Art

In magnetic recording HDDs, the read/write head is formed on an air-bearing slider that rides on a thin film of air above the rotating disk. A mechanical suspension comprised of a flexure with a gimbal at its end connects the slider to the disk drive's actuator arm. The slider is attached to the gimbal that allows for slight movement on the air bearing as the disk rotates. A transmission line provides electrical connection from the read/write circuitry, typically in a read pre-amplifier/write driver module or chip, through a short flex cable and suspension to the read and write elements on the slider. A suspension that integrates the mechanical connection with the electrical connection is called an integrated lead suspension (ILS) that is connected between the flex cable and connection pads on the slider. A typical ILS is a generally flexible laminate of a conductive metal substrate like stainless steel, an insulating dielectric layer like polyimide, and electrically conductive copper lines or traces patterned on the dielectric layer. The transmission line for the signals from the write driver to the write head thus include electrically conductive lines on the flex cable and the ILS.

A proposed HDD technology that uses a read head with multiple read sensors is two-dimensional magnetic recording (TDMR). In TDMR, multiple read sensors that are located on a single read head access the same or adjacent data tracks to obtain signals that are processed jointly. This allows the data tracks to be placed closer together, resulting in an increase in areal data bit density. A structure with multiple stacked read sensors for TDMR is described in US 2013/0286502 A1. However, TDMR presents challenges in the design of the ILS because of interference or cross-talk between the multiple read sensor signal lines on the ILS.

What is needed is an ILS for a TDMR HDD that minimizes cross-talk between the read sensor signal lines.

SUMMARY OF THE INVENTION

Embodiments of this invention relate to an interconnect for a TDMR disk drive wherein the read sensor signal lines are located on a lower level of a bi-level structure of conductive lines. Common return lines are located on an upper level above the signal lines and on the lower level between the signal lines. All of the return lines on the upper level are connected to one another by cross-connect lines, and vias are located along the interconnect and connect the upper return lines with the lower return lines and with the ground plane of the interconnects electrically conductive substrate. Thus all of the return lines form a single common return for the read signals from the read sensors. The interconnect is a coaxial-like interconnect because the return lines are located around each signal line and thus shield each signal line from the other signal lines, much like the outer conductive shield of a coaxial cable.

For a fuller understanding of the nature and advantages of the present invention, reference should be made to the following detailed description taken together with the accompanying figures.

DETAILED DESCRIPTION OF THE INVENTION

Figure 1:
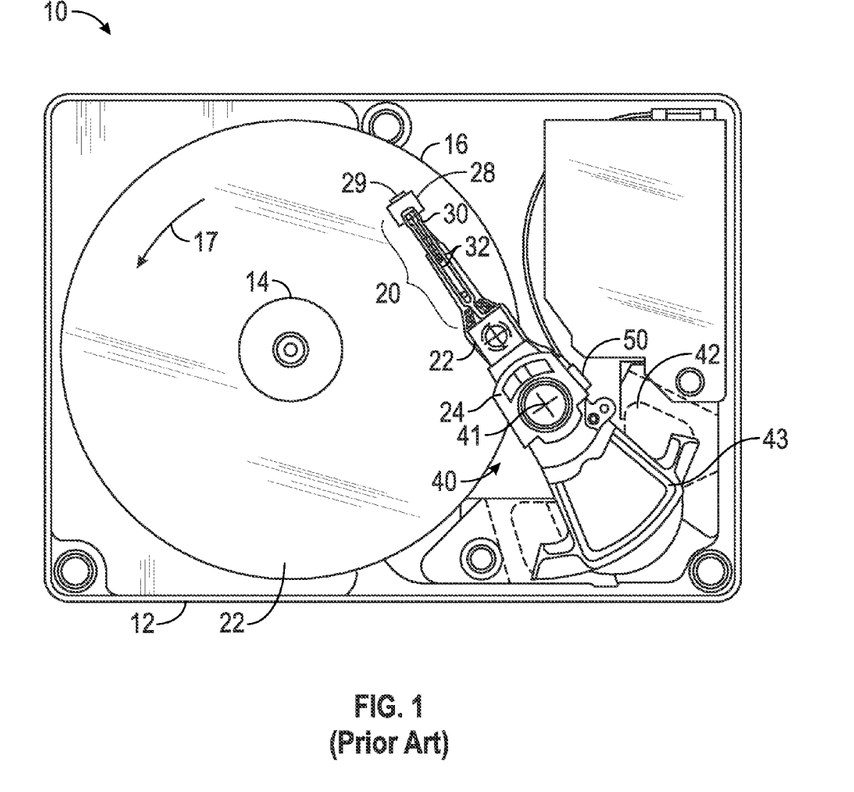
FIG. 1 is a top plan view of a head/disk assembly (HDA) of a prior art hard disk drive that may be for two-dimensional magnetic recording (TDMR) and illustrates an integrated lead suspension (ILS).

FIG. 1 is a top plan view of a head/disk assembly (HDA) of a hard disk drive 10. The hard disk drive 10 has at least one load beam assembly 20 having an integrated lead suspension (ILS) 30 according to the prior art with an array of electrically conductive traces or lines 32 that connect to a read/write head 29. The read/write head 29 is supported on an air-bearing slider 28. The load beam assemblies 20 are attached to rigid arms 22 connected to an E-block 24. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the heads 29 to the data tracks on the disks. The lines 32 connect at one end to the read/write head 29 and at its other end through a short flex cable to read/write circuitry contained in an electrical module or chip 50 secured to a side of the E-block 24. The chip 50 includes a read preamplifier/write driver circuit.

Figure 2:
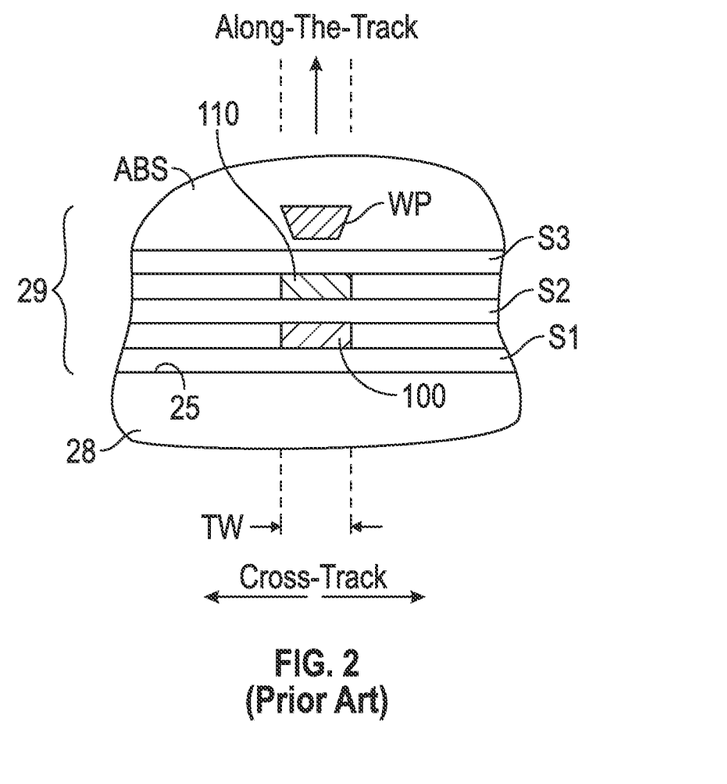
FIG. 2 is a view showing the ends of a read/write head as viewed from the disk, and shows two read sensors for TDMR.

FIG. 2 is a view showing the ends of read/write head 29 as viewed from the disk 12, and is thus a view of the air-bearing surface (ABS) of slider 28. The read/write head 29 is a series of thin films deposited and lithographically patterned on the trailing surface 25 of slider 28, using well-known thin film head fabrication techniques. The write head includes a perpendicular magnetic write pole (WP) and may also include trailing and/or side shields (not shown). For the purpose of explanation of this invention, the read head portion of read/write head 29 is depicted as a sensor structure of stacked multiple read sensors 100, 110 for use in a disk drive with two-dimensional magnetic recording (TDMR). In this example both read sensors 100, 110 are aligned with one another (vertically in FIG. 2) so as to read the same data track with trackwidth (TW). Lower read sensor 100 is located between two magnetic shields, lower shield S1 and center shield S2. Upper read sensor 110 is also located between two magnetic shields, center shield S2 and upper shield S3. A TDMR read head may include more than two read sensors.

Figure 3:
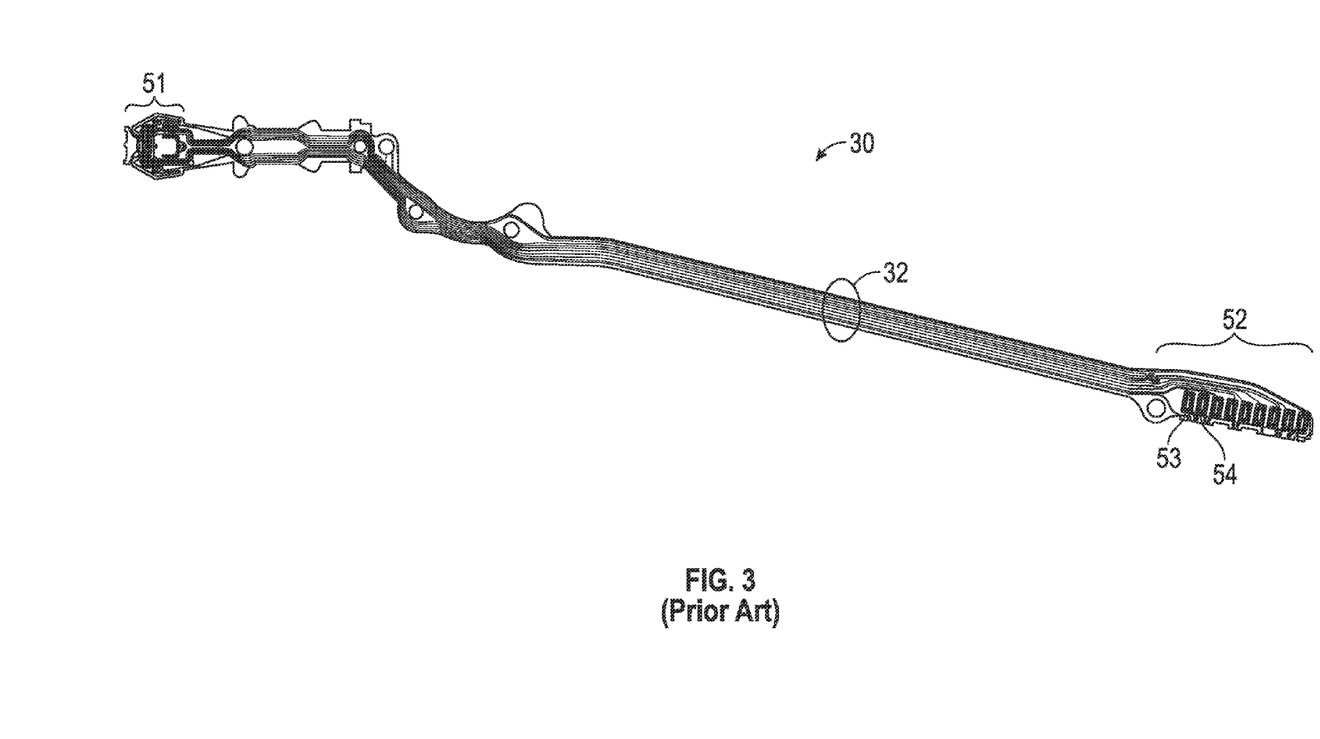
FIG. 3 is a plan view according to the prior art of the ILS of FIG. 1.

FIG. 3 is a plan view according to the prior art of the ILS 30. The ILS 30 is an interconnect of electrically conductive lines 32 between a gimbal portion 51 and a tail portion 52. The ILS 30 is a laminate comprised of three layers: an electrically conductive substrate like stainless steel, an insulating dielectric layer like polyimide, a conductive layer of copper for the electrical lines or lines patterned on the polyimide layer, and an optional insulating dielectric cover layer. The gimbal portion 51 supports the slider (not shown) that contains the read/write heads 29 (FIG. 1) and has conductive lines leading to pads for electrical connection to pads on the slider. The tail portion 52 has a plurality of electrical connection pads, like typical pads 53, 54 that are electrically connected to chip 50 (FIG. 1).

Figure 4:
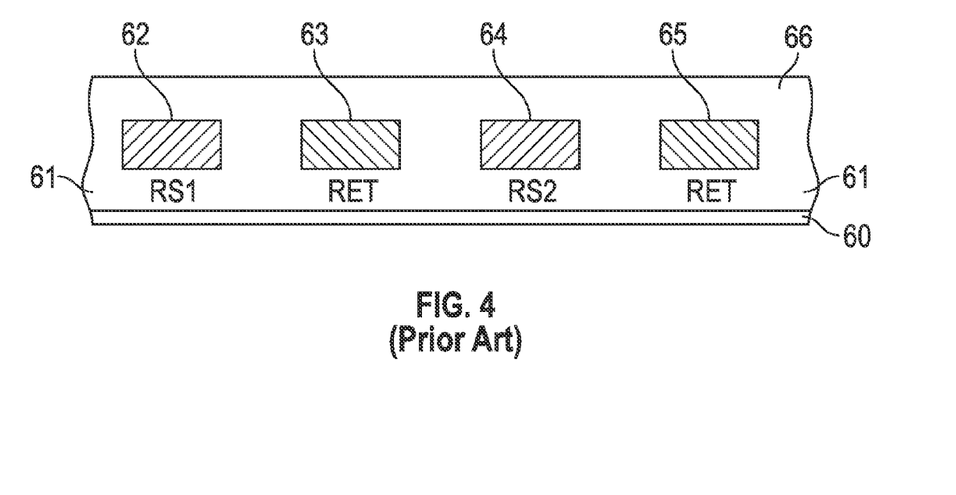
FIG. 4 is a sectional view of a portion of an ILS or interconnect showing just the read sensor signal and return lines for a TDMR disk drive with two read sensors according to the prior art.

FIG. 4 is a sectional view of a portion of interconnect 30 showing just the read signal and return lines for a TDMR disk drive with two read sensors according to the prior art. The interconnect 30 has an electrically conductive substrate 60, an insulator layer 61, read sensor signal lines 62, 64 for read sensor 1 (RS1) and read sensor 2 (RS2), respectively, and return (RET) line 63 and return line 65 for read sensor 1 and read sensor 2, respectively. All of the conductive lines 62-65 are formed on insulator layer 61. An optional insulating cover layer 66 may be formed over the conductive lines 62-65. The prior art structure of FIG. 4 has poor immunity from interference. Each read sensor signal line may experience crosstalk from the other read sensor signal line.

Figure 5:
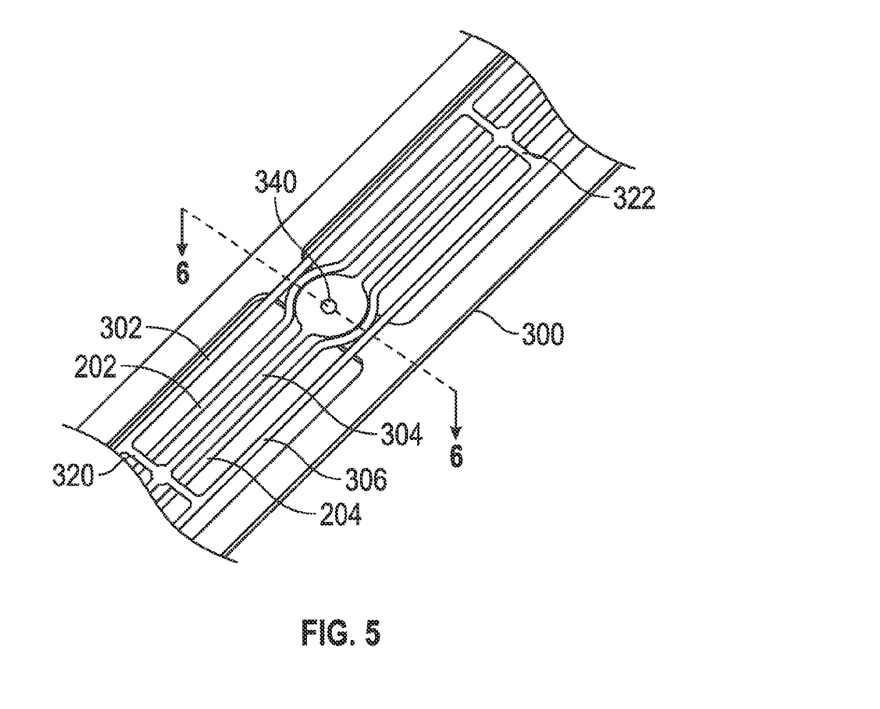
FIG. 5 is a perspective view of a portion of an ILS or interconnect according to an embodiment of the invention for a TDMR disk drive with two read sensors.

FIG. 5 is a perspective view of a portion of an ILS or interconnect according to an embodiment of the invention for a TDMR disk drive with two read sensors. Read sensor signal lines 202, 204 for read sensors 1 (RS1) and (RS2) are located on electrically conductive substrate 300 on a lower level of a bi-level structure of conductive lines. Common return lines 302, 304, 306 are located on an upper level above the read signal lines 202, 204. Another common return line 308 (not visible in FIG. 5) is located below return line 304 on the lower level between signal lines 202, 204. All of the return lines 302, 304, 306 on the upper level are connected to one another by cross-connect lines 320, 322. Vias 340 are located along the interconnect and connect return line 304 with the lower return line and with the ground plane of electrically conductive substrate 300.

Figure 6:
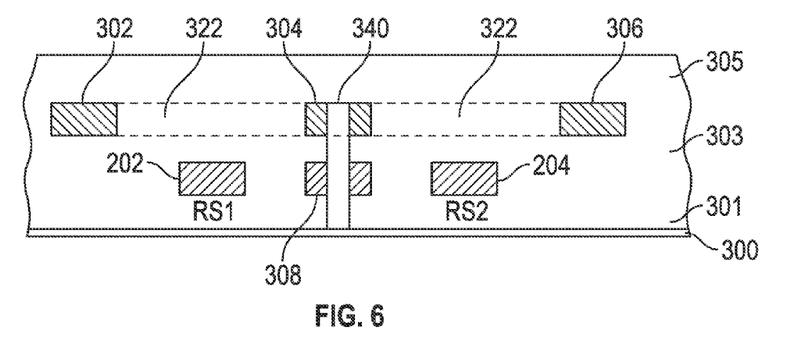
FIG. 6 is a sectional view of section 6-6 of FIG. 5 and illustrates the arrangement of the return lines relative to read sensor signal lines.

FIG. 6 is a sectional view of section 6-6 of FIG. 5 and illustrates the arrangement of the return lines 302, 304, 306, 308 relative to read sensor signal lines 202, 204. The signal lines 202, 204 and return line 308 are substantially coplanar and located on a first insulator layer 301 on substrate 300. Return line 308 is located between signal lines 202 and 204. A second insulator layer 303 separates the lower level of lines from the upper level of lines. An optional cover layer 305 of insulator is located over the upper level lines 302, 304, 306. Upper return lines 302, 306 are connected to upper return line 304 by cross-connect lines, like cross-connect line 322 (shown by dotted lines). Upper return line 304 is connected to lower return line 308 by electrically conductive via 340. Thus all of the return lines form a single common return for the read signals from the two read sensors.

The embodiment illustrated in FIGS. 5-6 is a coaxial-like interconnect. Return lines 302, 304 and 308 are located around signal line 202 and thus shield signal line 202, much like the outer conductive shield of a coaxial cable. Similarly, return lines 308, 304 and 306 are located around signal line 204 and thus shield signal line 204. In this manner the signal lines are shielded from one another by the common return line.

Figure 7:
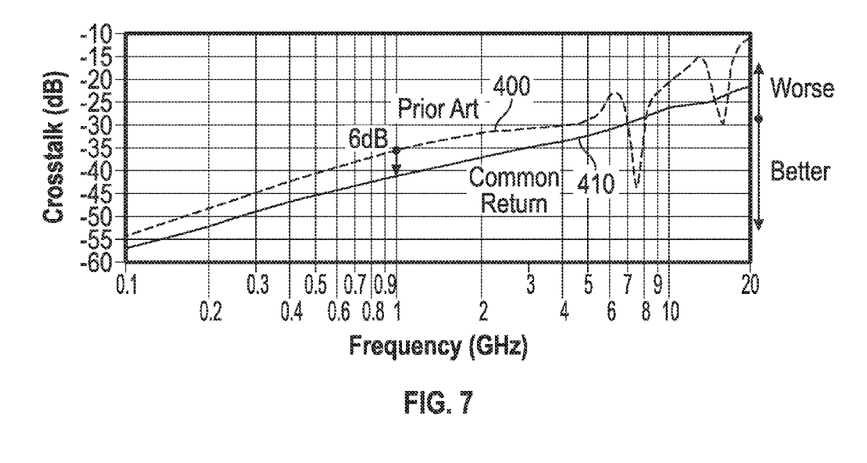
FIG. 7 is a graph of crosstalk (interference on one signal line from the other signal line) as a function of frequency for an interconnect according to the prior art and for an interconnect according to an embodiment of the invention.

FIG. 7 is a graph of crosstalk (interference on one signal line from the other signal line) as a function of frequency for an interconnect according to the prior art and an interconnect according to an embodiment of the invention. Curve 400 is for a prior art interconnect like that shown in FIG. 4 and curve 410 is for an interconnect like that shown in the embodiment of FIGS. 5-6. The interconnect according to the invention shows up to a 6 dB reduction in signal pickup.

Figure 8:
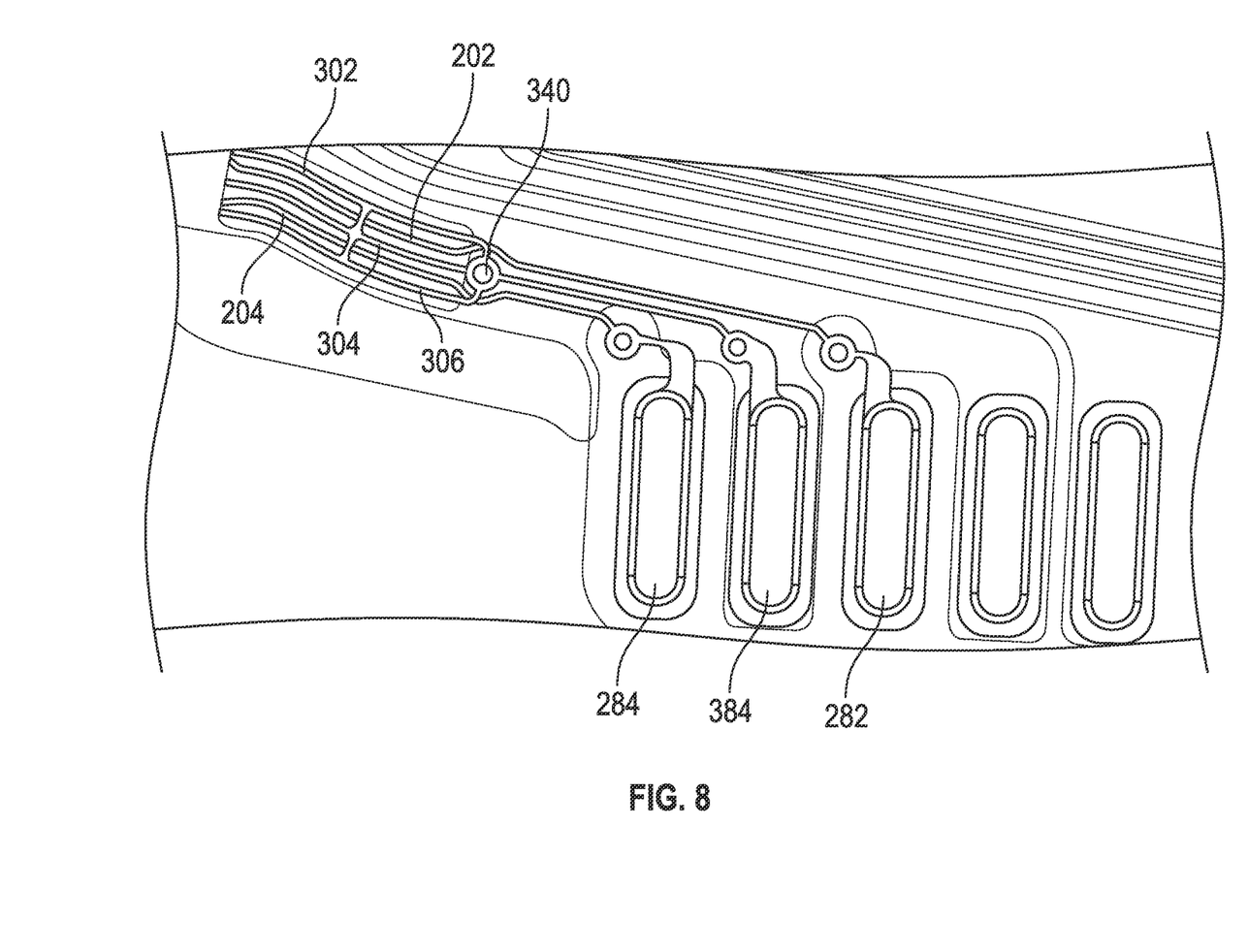
FIG. 8 is a plan view showing the tail portion of the interconnect according to an embodiment of the invention.
Figure 9:
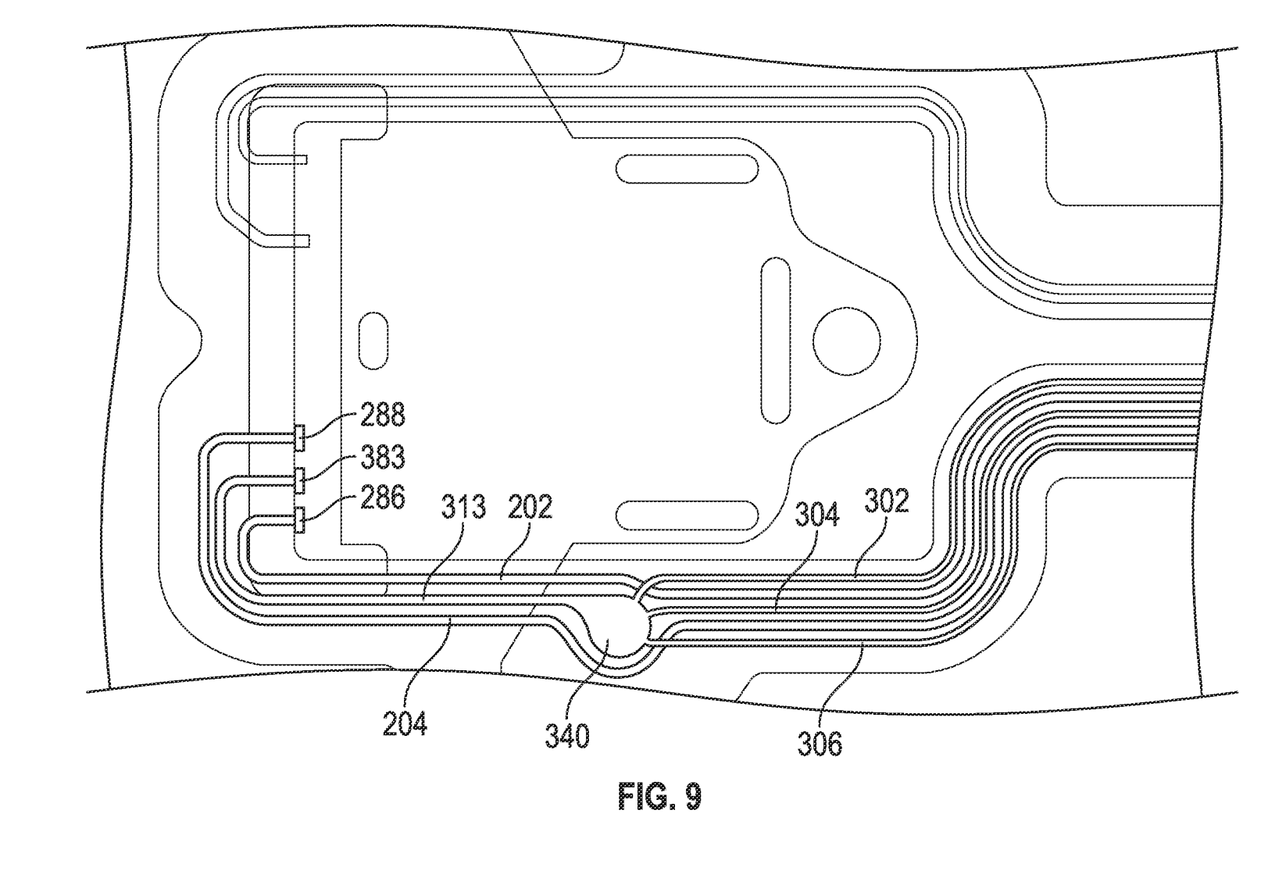
FIG. 9 is a plan view showing the gimbal portion of the interconnect according to an embodiment of the invention

FIG. 8 is a plan view showing the tail portion of the interconnect according to an embodiment of the invention. The pad 384 is the common return pad and connects to return line 304 and a via 340. Pad 384 is located on the tail portion between pad 282, which connects to signal line 202, and pad 284, which connects to signal line 204. The pads 384, 282, 284 provide electrical connection between the read head and the pre-amplifier chip, like chip 50 in FIG. 1. FIG. 9 is a plan view showing the gimbal portion of the interconnect according to an embodiment of the invention. The multiple return lines 302, 304, 306 are connected together and to the lower level return line 308 (not visible) at a via 340, which is connected to a single line 313 to pad 383 on the gimbal portion. Pad 383 for the common return line is located between pads 286, 288 for signal lines 202, 2040, respectively.

Figure 10:
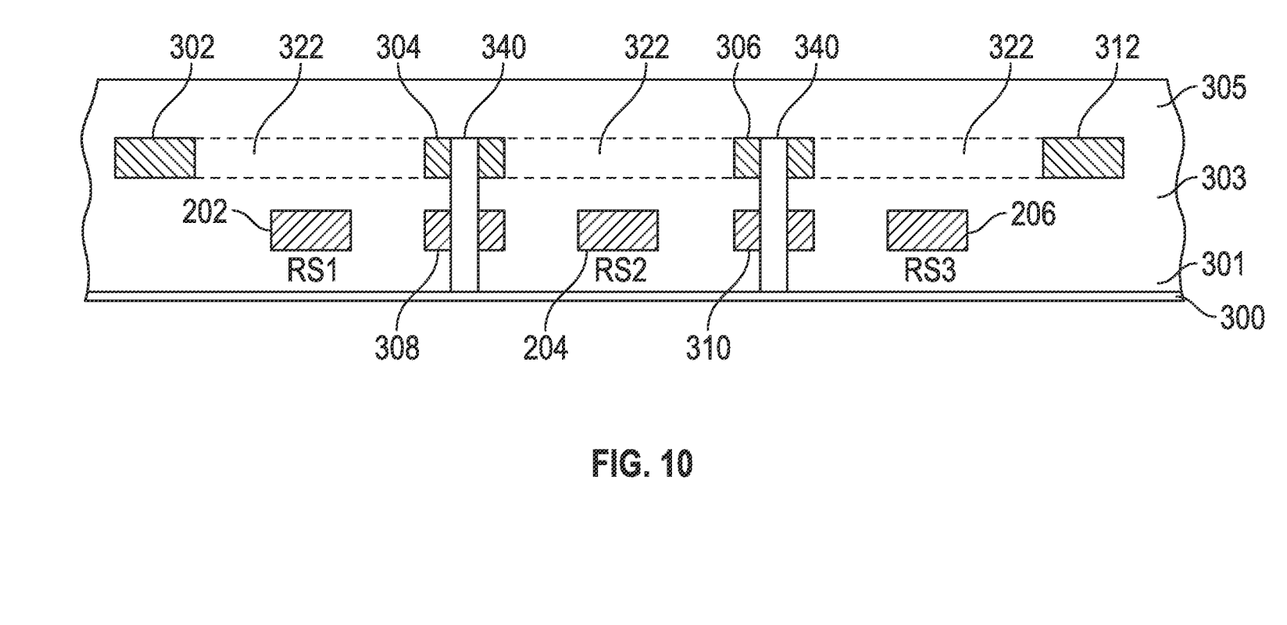
FIG. 10 is a sectional view for an embodiment of the interconnect with three read sensors.

The invention is applicable to a TDMR disk drive with any number of read sensors. FIG. 10 is a sectional view like that of FIG. 6, but for an embodiment applicable to three read sensors. A third read sensor signal line 206 and an additional return line 310 are located on the lower level, with return line 310 located between signal lines 204 and 206. Upper return line 306 is connected to lower return line 310 and to the substrate 300 by another electrically conductive via 340. An additional return line 312 is located on the upper level and spaced laterally from third signal line 206. Additional return line 312 is connected to the other return lines by cross-connect lines, like cross-connect line 322. Return lines 310, 306 and 312 are located around signal line 206 and thus shield signal line 206 from interference from the other signal lines 202, 204.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. An integrated lead suspension (ILS) for connection between a magnetic recording disk drive read head having multiple read sensors and a read head pre-amplifier chip, the ILS comprising:

an electrically conductive substrate;

substantially coplanar first and second electrically conductive read sensor signal lines electrically isolated from the substrate;

a plurality of interconnected electrically conductive read sensor return lines around and electrically isolated from each of the first and second sensor signal lines, wherein one of the return lines is substantially coplanar with and located between the first and second signal lines, and wherein a plurality of the return lines are substantially coplanar and located on the substrate above the first and second signal lines; and a plurality of electrically conductive cross-connect lines connecting the return lines.

2. The ILS of claim 1 further comprising a plurality of electrically conductive vias connecting one of the return lines above the first and second signal lines with the return line that is substantially coplanar with and located between the first and second signal lines.

3. The ILS of claim 1 further comprising a tail portion having a pad connected to one of the return lines.

4. The ILS of claim 3 further comprising a first pad connected to the first signal line and a second pad connected to the second signal line, and wherein the pad connected to the return line is located between the pads connected to the signal lines.

5. The ILS of claim 1 further comprising a third read sensor signal line substantially coplanar with the first and second signal lines and electrically isolated from the substrate, and wherein a first return line is substantially coplanar with and located between the first and second signal lines and a second return line is substantially coplanar with and located between the second and third signal lines.

6. A system for electrical interconnection of a magnetic recording disk drive pre-amplifier chip to a magnetic recording disk drive read head having multiple read sensors comprising:

a pre-amplifier chip;

a read head having multiple read sensors; and an electrical interconnect between the pre-amplifier chip and the read head, the interconnect comprising:

an electrically conductive substrate;

a first insulator layer on the substrate;

a lower level of electrically conductive lines on the first insulator layer comprising a first read sensor signal line, a second read sensor signal line and a first return line between the first and second signal lines;

a second insulator layer on the first level of lines;

an upper level of electrically conductive return lines on the second insulator layer;

a plurality of electrically conductive cross connector lines interconnecting all of the upper level return lines; and a plurality of electrically conductive vias connecting a first upper level return line to the first lower level return line.

7. The system of claim 6 wherein the vias connect the first upper level return line to the substrate.

8. The system of claim 6 further comprising a third read sensor signal line on the first level, a second return line on the first level between the second read sensor signal line and the third read sensor signal line, and a plurality of electrically conductive vias connecting a second upper level return line to the second lower level return line.

9. The system of claim 6 wherein the vias connecting the second upper level return line to the second lower level return line connect the second upper level return line to the substrate.

10. The system of claim 6 wherein the interconnect includes a tail portion having first and second pads connected to the respective first and second signal lines and a third pad between the first and second pads and connected to the tail pads, the tail pads being electrically connected to the pre-amplifier chip.

11. The system of claim 6 wherein the interconnect includes a gimbal portion having first and second pads connected to the respective first and second signal lines and a third pad between the first and second pads and connected to the gimbal pads, the gimbal pads being electrically connected to the read head.

* * * * *